US012205170B1

(12) United States Patent
Schwartz

(10) Patent No.: US 12,205,170 B1
(45) Date of Patent: *Jan. 21, 2025

(54) SECURITIES CLAIMS IDENTIFICATION, OPTIMIZATION AND RECOVERY SYSTEM AND METHODS

(71) Applicant: Dividex Analytics, LLC, Westwood, MA (US)

(72) Inventor: Irwin Schwartz, Dover, MA (US)

(73) Assignee: Dividex Analytics, LLC, Westwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,158

(22) Filed: Oct. 25, 2023

Related U.S. Application Data

(63) Continuation of application No. 17/675,504, filed on Feb. 18, 2022, now Pat. No. 11,836,796, which is a continuation of application No. 16/149,979, filed on Oct. 2, 2018, now Pat. No. 11,288,741, which is a continuation of application No. 14/313,811, filed on Jun. 24, 2014, now Pat. No. 10,102,575.

(60) Provisional application No. 61/838,516, filed on Jun. 24, 2013.

(51) Int. Cl.
*G06Q 40/04* (2012.01)
(52) U.S. Cl.
CPC .................... *G06Q 40/04* (2013.01)
(58) Field of Classification Search
CPC ...................................... G06Q 40/00
USPC ........................................... 705/38
See application file for complete search history.

(56) References Cited

U.S. PATENT DOCUMENTS

| 5,297,032 A | * | 3/1994 | Trojan | ................... | G06Q 40/04 |
| | | | | | 705/37 |
| 5,761,442 A | * | 6/1998 | Barr | ....................... | G06Q 40/06 |
| | | | | | 705/36 R |
| 5,812,988 A | * | 9/1998 | Sandretto | ............... | G06Q 40/00 |
| | | | | | 702/179 |

(Continued)

OTHER PUBLICATIONS

Thakor , et al., ""The Economics Reality of Securities Class Action Litigation", Navigant Consulting, Oct. 26, 2005, 37 Pages.", 37 Pages.

(Continued)

*Primary Examiner* — Kirsten S Apple
(74) *Attorney, Agent, or Firm* — GTC Law Group PC & Affiliates

(57) ABSTRACT

The system and methods for securities claims identification, optimization and recovery are disclosed herein. The disclosed system can maximizes returns on assets that are the securities claims arising from alleged fraud in the purchase or sale of securities in a securities portfolio. In one embodiment, the disclosed system monitors portfolio using analytics tools to identify asynchronous activity or movements in portfolio securities, performs loss and damages valuation analysis, open arms-length communications with securities litigation plaintiffs' bar and/or litigation funders, publishes relevant information to investors, provides analysis and information for merit analysis, counsel selection and/or litigation monitoring and performs risk mitigation analysis to identify securities claims and optimize recovery of revenue associated with the securities claims.

20 Claims, 6 Drawing Sheets

(56) References Cited

U.S. PATENT DOCUMENTS

| | | | | |
|---|---|---|---|---|
| 6,014,645 | A * | 1/2000 | Cunningham | G06Q 40/00 235/379 |
| 6,058,379 | A * | 5/2000 | Odom | G06Q 40/04 705/37 |
| 6,313,833 | B1 * | 11/2001 | Knight | G06Q 40/06 705/37 |
| 6,345,090 | B1 * | 2/2002 | Walker | G06Q 40/04 379/114.03 |
| 6,954,758 | B1 * | 10/2005 | O'Flaherty | G06Q 30/02 707/999.102 |
| 7,165,037 | B2 * | 1/2007 | Lazarus | G06Q 30/0269 705/7.31 |
| 7,376,431 | B2 * | 5/2008 | Niedermeyer | G07C 9/22 379/189 |
| 8,104,678 | B2 * | 1/2012 | Yoshikawa | G06Q 20/4037 235/492 |
| RE43,435 | E * | 5/2012 | Krause | G06Q 40/06 705/37 |
| 8,234,201 | B1 * | 7/2012 | Canabarro | G06Q 40/06 705/36 R |
| 8,412,605 | B2 * | 4/2013 | Griffin | G06Q 40/02 705/76 |
| 10,102,575 | B1 | 10/2018 | Schwartz | |
| 11,288,741 | B1 | 3/2022 | Schwartz | |
| 11,836,796 | B1 | 12/2023 | Schwartz | |
| 2002/0161677 | A1 * | 10/2002 | Zumbach | G06Q 40/00 707/E17.001 |
| 2002/0184134 | A1 * | 12/2002 | Olsen | G06Q 40/06 705/37 |
| 2003/0149648 | A1 * | 8/2003 | Olsen | G06Q 40/00 705/35 |
| 2005/0187854 | A1 * | 8/2005 | Cutler | G06Q 40/04 705/37 |
| 2005/0192899 | A1 * | 9/2005 | Reardon | G06Q 40/00 705/40 |
| 2007/0244795 | A1 * | 10/2007 | Lutnick | G06Q 40/04 705/37 |
| 2008/0301019 | A1 * | 12/2008 | Monk | G06Q 20/4016 705/35 |
| 2010/0023460 | A1 * | 1/2010 | Hughes | G06Q 40/06 705/36 R |
| 2010/0312701 | A1 * | 12/2010 | Bosch | G07F 19/20 705/43 |
| 2011/0145149 | A1 * | 6/2011 | Valdes | G06Q 20/102 705/44 |
| 2011/0178912 | A1 * | 7/2011 | Parsons | G06Q 40/00 705/35 |
| 2011/0264581 | A1 * | 10/2011 | Clyne | G06Q 20/10 705/39 |
| 2012/0029956 | A1 * | 2/2012 | Ghosh | G06Q 10/063 705/7.11 |
| 2012/0116820 | A1 | 5/2012 | English et al. | |
| 2012/0278254 | A1 * | 11/2012 | Rosenthal | G06Q 40/06 705/36 R |
| 2012/0323764 | A1 * | 12/2012 | Boberski | G06Q 40/04 705/39 |
| 2013/0226764 | A1 * | 8/2013 | Battyani | G06Q 40/04 705/37 |
| 2014/0156491 | A1 * | 6/2014 | Koh | G06Q 40/04 705/37 |
| 2014/0229353 | A1 * | 8/2014 | Lutnick | G06Q 40/04 705/37 |

OTHER PUBLICATIONS

Topol, et al., ""Aggregate Damages Calculations in Securities Cases", Plus Journal Professional Liability Underwriting Society May 2005, 3 pages.", 3 Pages.

* cited by examiner

SECURITIES CLAIMS IDENTIFICATION, OPTIMIZATION AND RECOVERY SYSTEM AND METHODS

CROSS-REFERENCE TO RELATED APPLICATIONS

This application is a continuation of U.S. patent application Ser. No. 17/675,504, filed Feb. 18, 2022, titled "SECURITIES CLAIMS IDENTIFICATION, OPTIMIZATION AND RECOVERY SYSTEM AND METHODS" (DVDX-0001-U01-C01-C01).

U.S. patent application Ser. No. 17/675,504 (DVDX-0001-U01-C01-C01) is a continuation of U.S. patent application Ser. No. 16/149,979, filed Oct. 2, 2018, titled "SECURITIES CLAIMS IDENTIFICATION, OPTIMIZATION AND RECOVERY SYSTEM AND METHODS", now U.S. Pat. No. 11,288,741, issued Mar. 29, 2022 (DVDX-0001-U01-C01).

Application Ser. No. 16/149,979 (DVDX-0001-U01-C01) is a continuation of U.S. patent application Ser. No. 14/313,811, filed Jun. 24, 2014, titled "SECURITIES CLAIMS IDENTIFICATION, OPTIMIZATION AND RECOVERY SYSTEM AND METHODS", now U.S. Pat. No. 10,102,575, issued Oct. 16, 2018 (DVDX-0001-U01).

Application Ser. No. 14/313,811 (DVDX-0001-U01) claims benefit of priority to U.S. Provisional Patent Application No. 61/838,516 filed Jun. 24, 2013, titled "SECURITIES CLAIMS IDENTIFICATION, OPTIMIZATION AND RECOVERY SYSTEM AND METHODS" (DVDX-0001-P01).

Each of the foregoing patents and/or applications is incorporated herein by reference in its entirety for all purposes.

BACKGROUND

A securities fraud is committed when a company (e.g., brokerage firm, corporation, investment bank) misrepresents information causing investors to make decisions to buy or sell securities on the basis of the misrepresented information. Information can be misrepresented when the company provides false information, withholds key information, offers bad advice, engages or allows insider trading, etc. Investors that bought or sold securities on United States markets during a "class period" and as a result of the securities fraud suffered economic injury can file a securities fraud class action lawsuit for monetary and/or non-monetary recovery. In a securities fraud class action lawsuit, one investor (e.g., a person or an entity) pursues a claim or claims in court on behalf of themselves and other similarly situated investors that together constitute the "class." The class period typically starts from the time the company first misrepresents information and ends when the truth is publicly disclosed. When the securities fraud class action lawsuit is settled or decided in plaintiffs' favor, each eligible member of the class can receive some recovery.

In many instances, many investors, investment managers, mutual funds, pension funds, etc., are not aware of potential securities fraud arising from their purchase of portfolio securities or miss the opportunity to maximize securities litigation recoveries due to conflicts and system inefficiencies. As a result, they either receive no recovery for securities fraud losses in their portfolio assets or receive substantially less recovery than possible.

DETAILED DESCRIPTION

Figure 1:
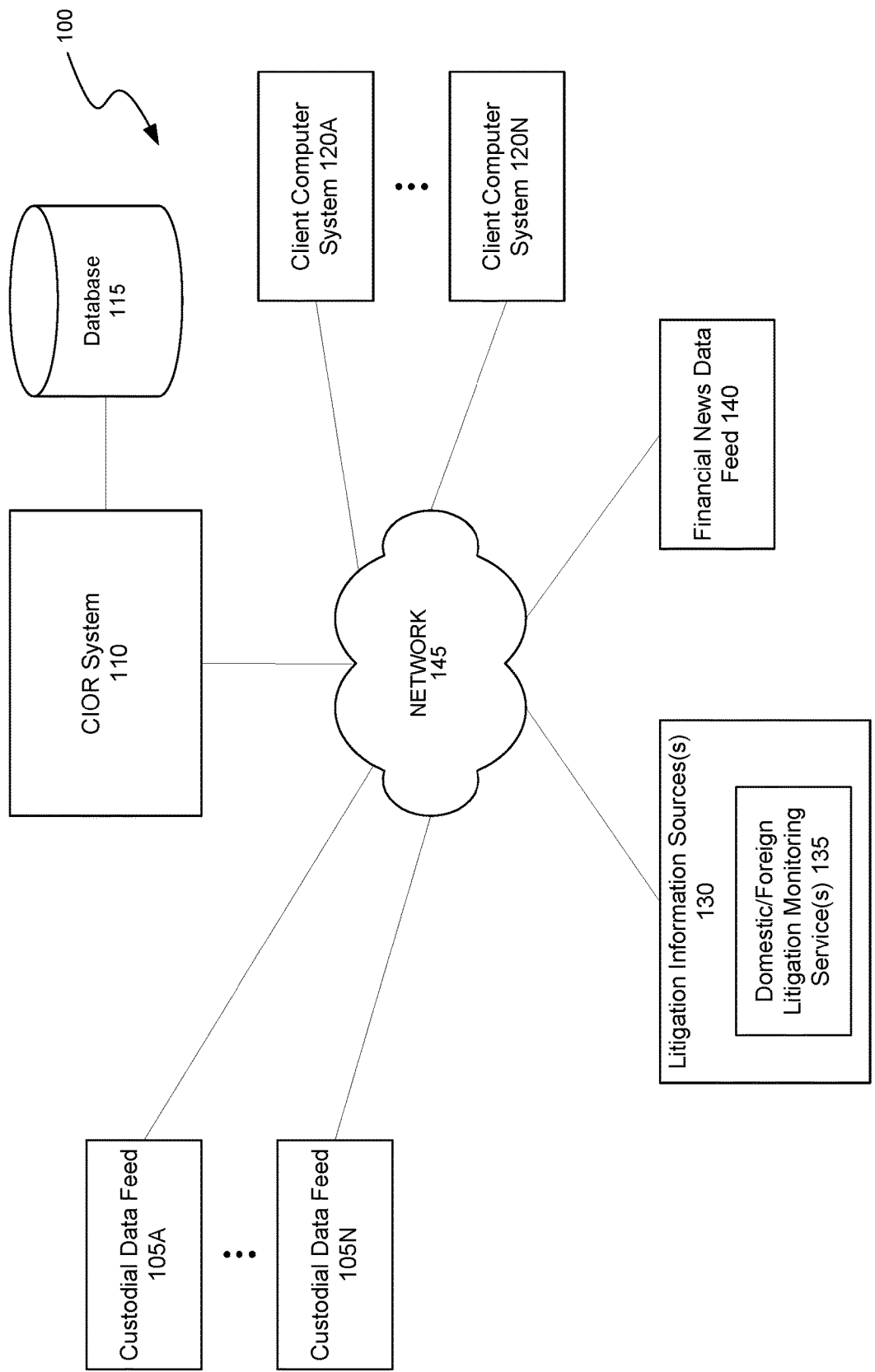
FIG. 1 illustrates a block diagram of an example environment in which a securities claims identification, optimization and recovery system can operate.

Embodiments of the securities claims identification, optimization and recovery system and methods (hereinafter the "CIOR system") disclosed herein provide a platform for optimizing or increasing portfolio value. In some embodiments, the CIOR system includes a platform for monitoring domestic and/or foreign portfolios for asynchronous activity to identify, evaluate, report, optimize and recover revenues associated with alleged securities fraud.

Investment managers have a fiduciary duty to maximize portfolio assets, which includes potential recoveries for material securities fraud losses. Securities fraud claims are typically processed by claims providers without any independent analysis or recovery maximization process, and are largely focused in the United States. Significant percentage of investors miss recoveries due to system inefficiencies, such as, investors not being aware of potentially actionable losses in portfolios, reliance on conflicted advisors which can lead to undue attention on class representative selection, insufficient data for timely analysis of key decisions, elimination of adversarial process due to settlement, large burden on judiciary, failure to optimize recoveries, focus on domestic claims only, no reconciliation from custodians, fragmented service providers, and the like.

Embodiments of the CIOR system provide a solution to the problems of the existing securities fraud claims processing by providing information and analysis, providing tools for identifying asynchronous movements in portfolio securities and reporting impact, opening communication with plaintiff's bar for analysis, providing damages valuation and reporting tools, independent conflict-free legal analysis at filing, settlement, opt out, and objection stages, unique claims filing methodology and reconciliation, hybrid compensation structure (e.g., market-rate monitoring flat fee and percentage of total assets recovered), and the like. In one embodiment, various features and functions of the CIOR system are automated. For example, the legal analysis can be automated to only identify issuers that have been sued for securities fraud or only ones that are the subject of regulatory action. Thus the analysis and recovery maximization process disclosed herein allows investment managers to maximize their portfolio assets, and thereby execute their fiduciary duty. For example, in one implementation, claims processing using the CIOR system yielded a 375% increase in the value of the claim as compared to using existing processing methods. Across an entire portfolio, the CIOR system has yielded a 20% increase in claims recovery experienced over the previously applied method. In some embodiments, the CIOR system can track one or more metrics for assessing the efficacy of the recovery maximization process for each client. For example, the CIOR system can track the difference between recovery determined based on a baseline claims recovery model and the actual revenue achieved upon settlement and disbursement. In some embodiments, the baseline claims recovery model is based on a 5-year (or another period of time) back-audit of the investor's class action filing recovery patterns.

Various embodiments of the CIOR system will now be described. The following description provides specific details for a thorough understanding and an enabling description of these embodiments. One skilled in the art will understand, however, that the embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Under the U.S. federal law, securities class actions function as "opt-out" classes. This means that investors do not need to participate as named parties in order to recover their pro rata share of a class action recovery. Rather, the investors need only submit a valid proof of claim. Although there are private companies that provide claims filing services, generally certain securities class (e.g., U.S. public pension funds) require that their custodians submit all proof of claims on behalf of the investors. As used herein, a custodian is a financial institution that holds its customer's securities (e.g., assets in a pension plan) for safekeeping and can additionally offer other services such as account administration, transaction settlements, collection of dividends, etc. Generally, major custodians are now consistently completing these forms for U.S. class action recoveries. However, there may be difficulties when a fund switches custodian or when a custodian transfers a fund's securities from one sub-account to another sub-account. For example, if a class period encompasses a period of time (in whole or in part) when a previous custodian was engaged, it may not be clear which custodian is required to submit the proof of claim. Investors can ensure that the terms of their custodial agreements provide a mechanism to address this issue. In addition, when a custodian transfers a fund's securities from one sub-account to another sub-account, the custodian generally records a zero basis in the new account, which causes an undercounting of the fund's recovery. Furthermore, the industry custom and practice among the leading custodians is not to reconcile recoveries and, therefore, these weaknesses in the claims filing system are rarely identified and corrected.

Suitable Environment

FIG. 1 illustrates a block diagram of an example environment 100 in which a securities claims identification, optimization and recovery system can operate. Although not required, aspects and implementations of the CIOR system 110 will be described in the general context of computer-executable instructions, such as routines executed by a general-purpose computer, a personal computer, a server, or other computing systems. Embodiment of the CIOR system 110 can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Embodiments of the CIOR system 110 can be implemented in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the CIOR system 110 described herein can be stored or distributed on tangible, non-transitory computer-readable media, including magnetic and optically readable and removable computer discs, stored in firmware in chips (e.g., EEPROM chips), an array of devices (e.g., Redundant Array of Independent Disks (RAID)), solid state memory devices (e.g., solid state drives (SSD), Universal Serial Bus (USB)), and/or the like. Alternatively, aspects of the CIOR system 110 can be distributed electronically over the Internet or over other networks (including wireless networks). Those skilled in the relevant art will recognize that portions of the CIOR system may reside on a server computer, while corresponding portions reside on a different computer (e.g., a client computer). Data structures and transmission of data particular to aspects of the CIOR system 110 are also encompassed within the scope of the embodiments.

Referring to FIG. 1, the CIOR system 110 operates in environment 100. Client computer systems 120A-120N, such as desktop computer, laptop computer, tablet, mobile device, or the like, are used by users of the CIOR system 110 to access a web-based interface provided by the CIOR system 110 via networks 145. Examples of the users of the CIOR system 110 include clients or customers (e.g., customer asset manager), admin users and analyst users supporting the CIOR system 110. Networks 145 can include wired and wireless, private networks and public networks (e.g., the Internet). Client computer systems 120A-N use network interfaces to connect and/or communicate with networks 145, either directly, or via wireless routers or cell towers. Network interfaces may employ connection protocols such as direct connect, Ethernet, wireless connection such as IEEE 802.11a-n, and the like to connect to networks 145. The CIOR system 110 is in communication with a database 115 that can include one or more database tables for storing data relating to claims, active cases, claims pipeline, recovery reports, value reports, other raw and/or processed data, client settings and configurations, policies and/or the like.

As illustrated, the environment 100 also includes one or more custodial data feeds 105A-N from the custodians of securities portfolios of investors. The custodial data feeds provide data relating to trades and other activities associated with securities portfolios that can be used by the CIOR system 110 to identify potential claims. The environment 100 also includes one or more litigation information sources 130 that can connect to the CIOR system 110 over network 145 to provide notification and other updates relating to securities litigations which can be used by the CIOR system 110 to evaluate or facilitate evaluation of potential claims to determine whether any of the potential claims are actionable and optimize recovery from the actionable claims. The litigation information sources 130 can include one or more domestic and/or foreign litigation monitoring services 135. In some embodiments, the CIOR system 110 can subscribe to other data feeds such as the financial news data feed 140 for news and other information relating to local and/or global financial markets.

Securities Litigation Policy for Global Securities

Figure 2:
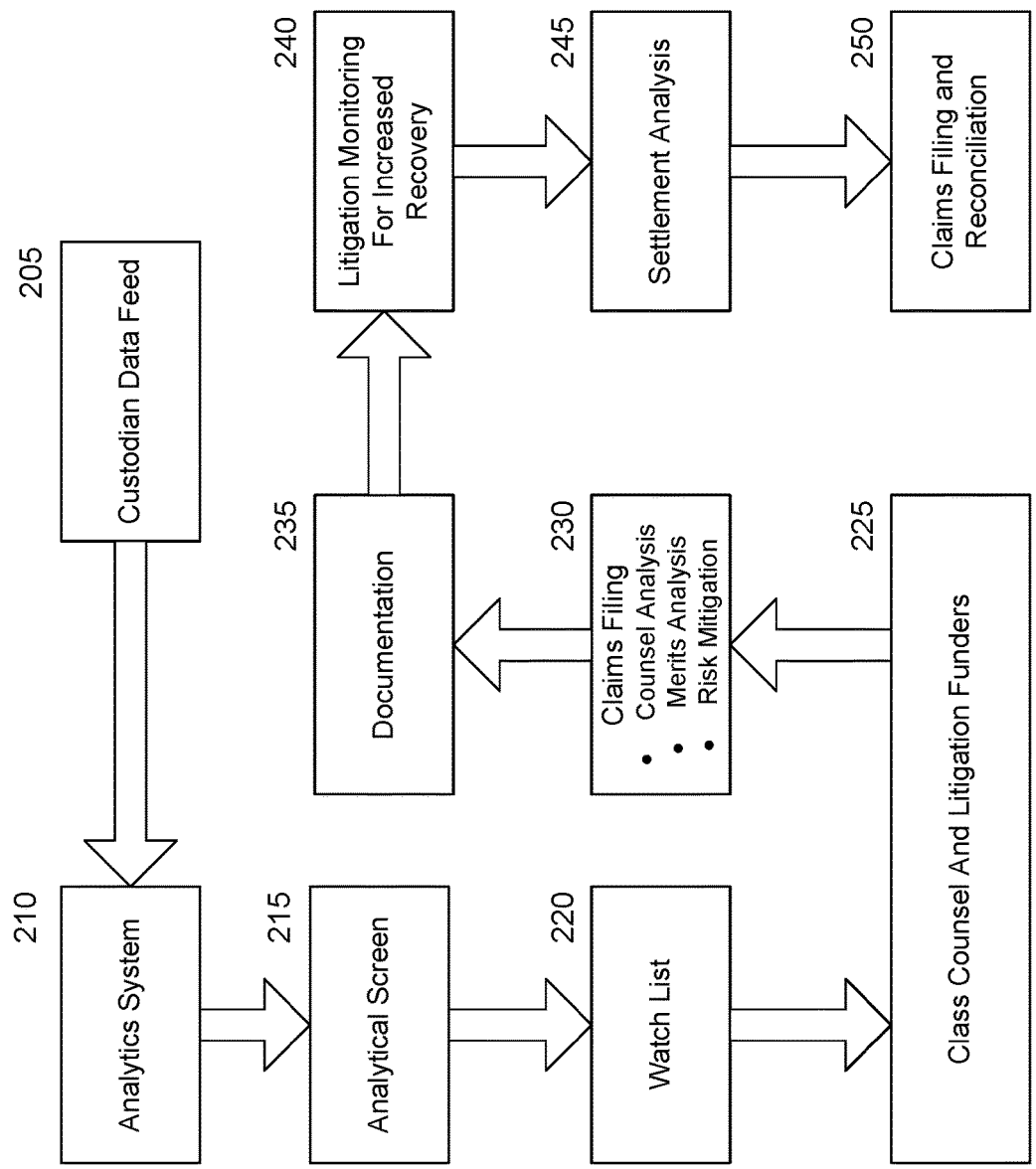
FIG. 2 illustrates a block diagram of an example embodiment for identifying, optimizing and recovering securities claims for securities listed on domestic exchange and foreign exchanges.

FIG. 2 illustrates a block diagram illustrating flow of data in identifying, optimizing and recovering securities claims by the CIOR system (e.g., CIOR system 110 of FIG. 1) for global securities (i.e., securities listed on a domestic exchange or a foreign exchange). Investors do not have the protection of the U.S. securities laws if the securities were purchased on a foreign exchange. The CIOR system can be implemented to identify, optimize and recover claims for global securities litigation by monitoring global securities portfolio to ensure that opportunities to recover assets based on securities fraud are not lost. The CIOR system can further perform an analysis of whether to bring a state law action or participate in an action in a foreign jurisdiction. It should be noted that unlike the U.S. class action process, in foreign actions investors are generally required to "opt-in" to join foreign proceedings at filing or shortly thereafter by pleadings amendment. The "opt-in" process can require affirmative decisions early in the process to join the case in order to recover the investor's share of the proceeds. In many cases, investors may be required to make these decisions before a foreign action is even filed and the CIOR system provides investors insight in that time frame.

The CIOR system includes a custodian data feed (block 205) that provides raw portfolio information (e.g., shares purchased or sold, relevant dates and pricing therefor and/or other trading data) to a trading data analytics system (block 210). The custodian data feed (block 205) can include information that is monitored and/or analyzed to detect asynchronous activity in securities portfolios of investors including institutional investors such as insurance companies, retirement or pension funds, mutual funds, hedge funds, banks, trusts, endowment funds, investment banks, and/or the like.

The information in the custodian data feed (block 205) can be analyzed by analytic tools of the analytics system (block 210) to detect or identify asynchronous activity in a securities portfolio. Identification of an asynchronous activity that include screening portfolio securities into volatility baskets (block 215), evaluating disparate proportionate movement in portfolio securities in which the economic impact to the holdings exceed certain thresholds set by the client, and reporting or flagging any impact. In one implementation, for example, the analytic system (block 210) can include a script or a module for creating a watch list (block 220) or an alert. The watch list can be created to monitor, track and/or compare, for example, per week (or other time period) price change percent for a portfolio security relative to a statistical measure (e.g., mean, median, etc.) of per week price change percent for securities of a sub-industry index (Global Industry Classification Standard (GICS) or other relevant associated indexes by industry). The watch list 220 can be customizable based on each client's sensitivity to degree of asynchronous activity as well as intra-day, week and month trading losses per security. In some embodiments, the reports from the watch list can be accessed via a client dashboard. In some embodiments, the custodian data feed can also be monitored using analytic tools (block 210) that have been customized to identify securities listed on a foreign exchange and which meet certain criteria.

Some or all of the information identified in the watch list (e.g., potential claims identified) can be provided by open arm's length communication to the class counsel of a securities litigation and litigation funders (block 225) for review and/or analysis of the merits of the claims for claims filing at block 230. Litigation funders can be investors who fund the foreign litigation costs in exchange for a fee that can be a percentage of the entire fee to be paid or can be reimbursement of expenses and any costs award. In some embodiments, the claims on the watch list are reviewed or screened using an automated process that correlates information relating to the asynchronous behavior of the securities on the watch list with information such as financial market updates, updates from portfolio companies, market moving or breaking news, legal activity news, and/or other information aggregated from news sites, blogs, Twitter feed, and/or other sources ((e.g., via web crawlers, data feeds, etc.) to determine if the asynchronous behavior exhibited by the securities on the watch list is likely due to securities fraud or due to other events (e.g., drop in stock price of a company due to news about CEO's health problems).

The class counsel or litigation funders can review the claims in the watch list and determine whether the claims are actionable or non-actionable (block 230). For example, the class counsel can review the trading records, loss and other information, and determine if the investor should be a class representative. In some embodiments, lawsuit class periods are compared to securities trading history to identify cases where a securities case is a class member and to estimate a loss figure associated with each class action filing. In alternate embodiments, the CIOR system can identify and analyze securities cases to perform this function, and to report its findings on a timely basis. In some embodiments, the CIOR system can utilize analysis, including merits analysis (e.g., evaluating the merits of the case in light of the law in the jurisdiction where the action is being brought) and risk mitigation (e.g., identifying and mitigating risks such as the extent to which a loser pay is covered, potential discovery burdens, and the like) to assist the investor to maximize recoveries.

Unlike the familiar and well-developed securities class action litigation in the United States, outside the United States securities fraud cases involve risk arising from legal costs shifting. While financial institutions (particularly those that manage client/policyholder funds) have a fiduciary duty to seek to recover securities fraud losses in their portfolios, with respect to non-US equities they need to evaluate whether to absorb the risk of an adverse prevailing party fees and costs award. In short, institutional investors are confronted with the difficult task of weighing their duty to recover portfolio losses against the potential Adverse Party Legal Expense (APLE) if they are unsuccessful. For those that elect to join such foreign securities fraud cases, after-the-event APLE insurance (known as "ATE" insurance) can be extremely expensive and made more so if the premiums are financed through litigation funders on a contingency basis, which reduces potential recoveries.

Some embodiments of the CIOR system provide an APLE cover on a before-the-event basis that spreads the risk across multiple claimants in multiple cases pending in multiple jurisdictions, resulting in relatively inexpensive premiums while mitigating risks. Clients can be provided with a direct policy protecting against APLE up to an amount (e.g., $100,000) for each case (and typically up to an annual aggregate) meeting strict objective underwriting criteria. In some embodiments, the APLE insurance can be available only for cases in which the relevant regulator or criminal authority has found significant wrongdoing and is not available for United States-style "strike suits" or speculative securities litigation. Should a particular case require higher limits, the CIOR system can utilize established reinsurance and fronting relationships to obtain highly discounted excess cover to meet any limit profile needed.

In some embodiments, the results from the analysis of the claims, and based on certain policies and procedures, the CIOR system can facilitate determination of how to maximize the value of class action securities litigation claims relating to a portfolio. An evaluation policy that can provide guidance regarding when and how to become involved in securities litigation and, when it is advantageous to seek class representative status in any particular class action, can be adopted to identify, protect, and serve the interests of the investors. Using the evaluation policy, the investment manager or custodian's fiduciary duty can be met by effectively managing claims as fund assets, increase in recoveries on claims can be obtained, fees paid to obtain recoveries can be reduced, future frauds can be deterred by imposing personal liability on bad actors, corporate governance issues can be identified and corporate governance improvements through litigation can be developed, the litigation system can be changed to better protect interests of shareholders and meet some or all of the above. The CIOR system can assist in decision making regarding securities litigation issues from monitoring of cases through selection of counsel.

The CIOR system can further include a presentation layer that aggregates and/or tracks and displays on a dashboard documentation relating to one or more of: watch list, notice of domestic and foreign filings, last-in, first out (LIFO)/first-in, first out (FIFO) and/or other maximum damages analyses, relevant publicly available documents including significant developments in pending litigation, determination of recognized loss and settlement recovery estimates, and the like (block 235).

In some embodiments, the CIOR system monitors class action filings for increased recovery (block 240) (e.g., using Stanford Class Action Clearinghouse web site, private non-law firm monitoring service, and/or other resources). Even if the investor is not a class representative in a class action lawsuit, monitoring of class action filings can provide opportunities for mitigating transaction costs such as attorney fees, and the like. In some embodiments, for example, the CIOR system can monitor class action filings for which a securities portfolio (e.g., a pension fund) has sustained a loss that (i) exceeds its loss threshold per security, which threshold can be customized based on various criteria such as based on stock volatility or asset class or (ii) is substantial and where there are special factors justifying fund's involvement despite the fact that losses are below its loss threshold. The loss threshold can depend on the size of the fund (e.g., public pension fund) and/or other criteria. In some embodiments, the loss threshold for determining whether to monitor the class action filings can be set at the same level or at a different level from the loss threshold used in evaluating whether to add a security to a watch list. For example, for funds with assets greater than $30 Billion, the loss threshold per portfolio security can be $5 Million. Similarly, a loss threshold of $1 Million can be set for funds with assets between $10 and 5 Billion, a loss threshold of $250,000 can be set for funds with assets between $1 and 5 Billion, and a loss threshold of $150,000 can be set for funds with assets below $1 Billion. The CIOR system can utilize a monitoring policy (e.g., monitoring policy for US actions, monitoring policy for foreign actions the foreign actions) so that the relevant deadlines and issues can be resolved in a timely manner.

When the case settles, the CIOR system can perform settlement and opt-out analysis (block 245). The settlement analysis can include a comparison of a settlement amount against an amount calculated based on a damages recovery valuation model, analysis of fairness and reasonableness of proposed transaction costs to the settlement to determine the efficacy to the client, and the like. The claims recovery process can be implemented by filing claims and reconciling any recovery from the settlement to ensure all amounts due are paid by the settlement agent, assuming the investor does not opt out (block 250). The claims can be processed by a claims processor using information from the custodian data feed (block 205). The claims processor can determine how to maximize the value of any litigation claims relating to the portfolio. Using information from the custodian data feed (block 205), during the pendency of any lawsuit and upon its proposed settlement, the claims processor can make a determination as to a viability of case opt-out strategy, any objection to any settlement, any objection to any legal fees application (e.g., from attorneys), investor's recognized loss under the adjudication, and the like.

In some embodiments, the claims processor can also generate and provide a report to allow the investor to select a favorable methodology under which the claims should be submitted. The report can include, for example, recovery calculations on an aggregated and disaggregated basis on a real time basis. When the investor has multiple sub-accounts, the claims recovery can depend on whether an aggregated or disaggregated analysis of the client's portfolio across multiple sub-accounts is used. In the aggregated analysis, holdings are aggregated into a single filing, while in the disaggregated analysis, the claims are filed for each sub-account or in any other segmented way. The selection of one analysis over the other may depend on conditions such as settlement terms, buy in a certain window, sell in a certain window, net seller, and the like. Existing claims processors do not have the flexibility to allow the investor to select a basis (i.e., aggregated or disaggregated analysis) for claims filing, since the basis is selected before an investor account is setup. In the CIOR system, the database(s) storing the investor, trade, and other data are structured in such a way to allow calculations to be performed on both aggregate and disaggregate basis, and allow the investor to select a basis that is aligned with the investor's recovery strategy. For example, the report (e.g., Table 1) from the claims processor can be fed into the presentation layer (e.g., via an application programming interface (API) or other methods), and displayed on a dashboard or other user interface to the investor. The investor can review the report and select a basis based on the recognized loss (RL) amount, and/or other strategic considerations (e.g., to assign recovery to the investment manager who made the loss). In some embodiments, the recognized loss is defined as the amount of the settlement reflecting the loss per share or per unit of security. In some embodiments, the claims processor automatically selects an aggregate or disaggregate basis that maximizes the recovery (i.e., the basis that shows the highest recognized loss).

TABLE 1

Aggregate And Disaggregate Recognized Loss (RL) Comparison

| Case Name | Case Status | Claims Processing Status | Disaggregate RL | Aggregate RL | Delta RL |
|---|---|---|---|---|---|
| ABC Bank, Inc. Securities Litigation | Disbursement | Disbursed | 2,678 | 19,836 | 64% |
| PQ Bank, Inc. Securities Litigation | Disbursement | Disbursed | 4,687 | 5,586 | 19% |
| XY Bank, Inc. Securities Litigation | Settled | Active | 48,246 | 86,785 | 80% |
| TS Bank, Inc. Securities Litigation | Settled | Active | 482,636 | 482,636 | 0% |

The example report from the claims processor depicted in Table 1 above can also include information such as the case name/identifier, securities identifier, case status, claims processing status, recognized loss using disaggregate method, recognized loss using aggregate method, delta of the recognized loss, disaggregate payout, aggregate payout, delta payout, pro rata, and the like. In some embodiments, the claims processor can identify from the trading data if there is zero basis for any sub-accounts, as a result of moving assets from one sub-account to another. The claims processor can then identify zero basis in the claims, and correct for it, to prevent the claims from being rejected.

The claims processor receives the user selection of the aggregate/disaggregate basis for claims recovery (or automatically selects one to maximize recovery) and submits the claims in accordance with the instructions from the investor. The claims processor can reconcile funds obtained from the claims recovery process against the recognized loss, and distribute the funds to the investor (block 250). In cases where the recovery is not reconciled with the recognized loss, the claims processor can generate an alert or notification for further review and/or verification for reconciliation.

Figure 3:
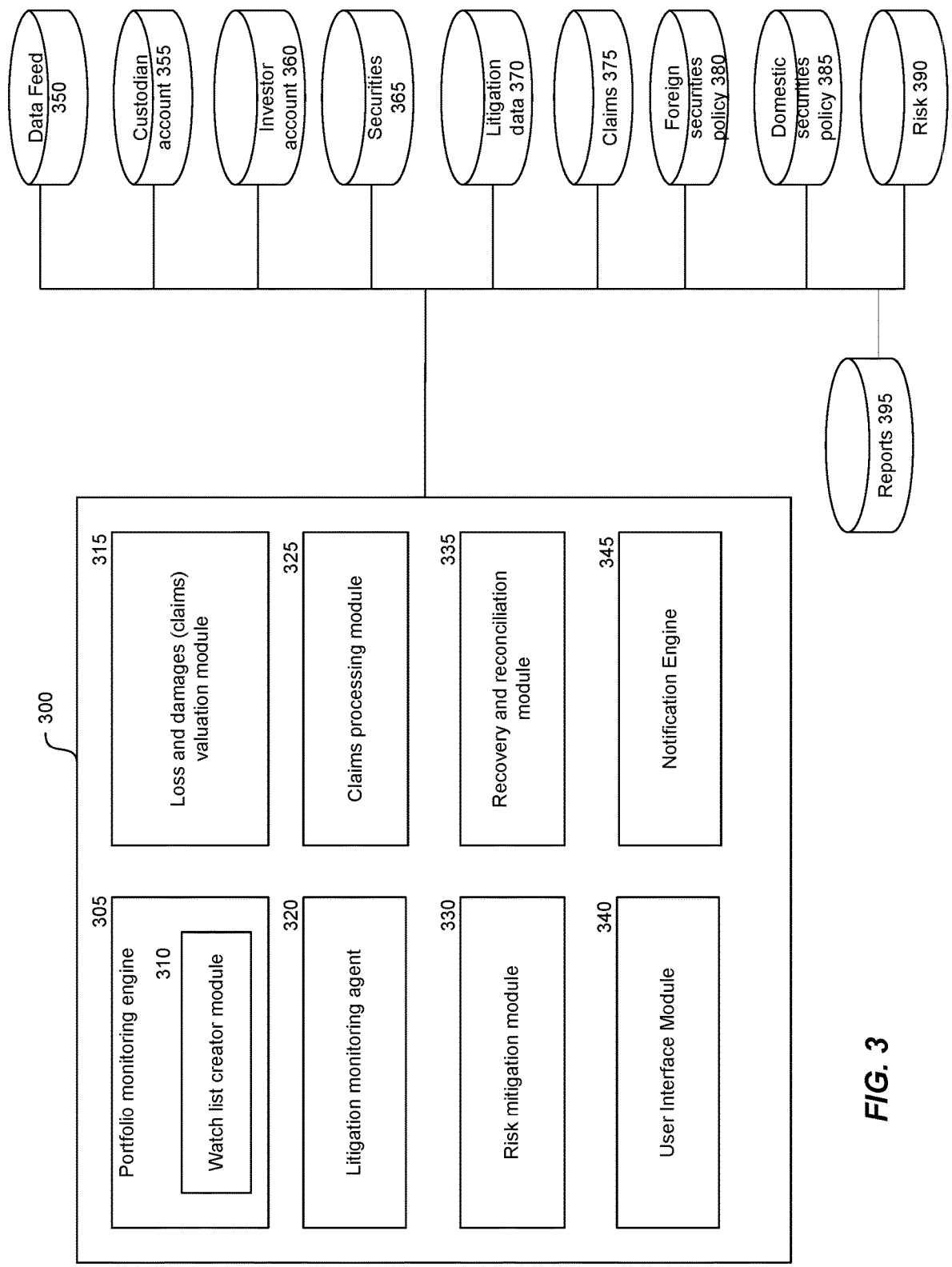
FIG. 3 illustrates a block diagram of an example embodiment of the securities claims identification, optimization and recovery system.

FIG. 3 is a block diagram that illustrates an example embodiment of the CIOR system 300. In some embodiments, the CIOR system 300 includes a portfolio monitoring engine 305 having a watch list creator 310, a loss and damages valuation module 315, a litigation monitoring agent 320, a claims processing module 325, a risk mitigation module 330, a recovery and reconciliation module 335, a user interface module 340, a notification engine 345, among others. The system 300 can be coupled to or be in communication with one or more database tables such as the data feed table 350. a custodian account table 355, an investor account table 360, a securities table 365, a litigation data table 370, a claims table 375, a foreign securities policy table 380, a domestic securities table 385 and a risk table 390, a reports table 395 among others.

As used herein, a "module," "engine" or an "agent" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. One or more of the disclosed modules and agents may be implemented on the same machine or distributed among different machines.

The portfolio monitoring engine 305 can monitor one or more securities portfolios using data from the data feed 350 to identify suspicious losses in a securities portfolio, whether domestic or foreign-exchange traded (i.e., securities claims). Securities, in some embodiments, include debt securities, equity securities, derivative contracts, foreign securities, and/or the like. The information relating to various securities (e.g., securities ID, type, name, issuer, etc.) can be stored in the securities table 365. The portfolio monitoring engine 305 can be configured to detect or identify certain events (e.g., asynchronous movements in equity portfolio securities, minimum loss threshold, etc.) and can create and/or customize a watch list (e.g., via the watch list creator module 310). In some embodiments, the portfolio monitoring engine 305 determines whether there is an asynchronous activity in a portfolio security by determining if a portfolio security moves more than a threshold as compared to the movement of the relevant industry index. For example, if oil and gas index is flat, but there is more than 5% drop in the stock price of a specific oil and gas company, the portfolio monitoring engine 305 can identify the security as having an asynchronous activity, and include it for further evaluation on the watch list. The threshold for determining whether there is an asynchronous activity can be configurable, and can vary with the client. For example, some clients may set a lower threshold to be more aggressive in detecting securities fraud, while other clients may set a higher threshold. In some cases, the portfolio securities can have different volatilities, and thus, the volatility of the securities can be considered when detecting asynchronous activity. For example, shares of a startup company can be more volatile compared to shares of an oil and gas company, and thus a 5% drop in the shares of the startup company may be more common, than a 5% drop in the oil and gas company. In some embodiments, the portfolio securities can be assigned to different volatility baskets (e.g., 10%, 5% and 2% volatility baskets), each of which can have its own threshold for detecting asynchronous activity to account for volatility when detecting asynchronous activity in the portfolio securities.

In some embodiments, the portfolio monitoring engine 305 determines or track losses on portfolio securities on a day, week, month or other time basis. A minimum loss threshold can be specified to configure the portfolio monitoring engine 305 to flag only those securities having asynchronous activity that meet the loss threshold. Other criteria for flagging asynchronous activity can be configured. The thresholds for domestic and foreign trading losses can also be set separately in some embodiments.

When asynchronous activities are detected in the portfolio securities, the monitoring engine 305 can create an alert and/or generate and/or update the watch list. The watch list (e.g., via the watch list creator module 310) can include information identifying portfolio securities having asynchronous activity, any news stories associated with the issuer of the securities, trading losses including one day, one week and/or one month losses, and the like for both U.S. and foreign securities. An example, watch list for U.S. and foreign securities is depicted in Table 2 below.

TABLE 2

Watch List For Domestic Securities For Client ABC's Portfolio

| Date | Company | News | One Day Loss | One Week Loss | One Month Loss |
|---|---|---|---|---|---|
| February 27 | DP Pharma, Inc. | Company failed to disclose that 5% of the patients who were administered xyz injection for treating high blood pressure experienced serious life threatening reaction. | $[850,256.50] (−17.00%) | $[902,672.20] (−18.03%) | $[1,601,500.00] (−32.03%) |
| February 31 | XYZ Brands Inc. | Filings with the U.S. securities and Exchange Commission contains material omission and/or misstatements concerning the sales processes leading up to the merger between XYZ Brands, Inc. and PQ Brands, Inc. | $[1,005,300.12] (−20.10%) | $[1,230,540.67] (−24.61%) | $[982,205.02] 14.34% |

TABLE 3

Watch List For Foreign Securities For Client ABC's Portfolio

| Date | Company | New | One Day Loss | One Week Loss | One Month Loss |
|---|---|---|---|---|---|
| January 30 | All Italia Oil and Gas SpA | Allegations from European investors that the company overstated its oil and gas reserves. | $[19,650,200.20] (−26.67%) | $[19,800,400.21] (−27.12%) | $[20,100,200.98] (−28.12%) |
| February 11 | Middle East Energy Industries | Concerns that the company shares were undervalued during its acquisition by China Energy Conglomerate | $[16,500,000.10] (−23.0%) | $[11,500.500.98] 6.56% | $[14.500,000.88] 18.21% |

The loss and damages (claims) valuation module 315 can determine a value of a claim using one or more valuation methods. For example, the module 315 can utilize historical settlement data to create a valuation metric for claims at filing, or even prior to the filing. Based on the valuation, clients can make a decision whether to opt out (or opt in), determine if the settlement is fair, if the attorney fees are fair, and the like.

The litigation monitoring engine 320 can monitor the progression of the litigation, occurrence of any events such as settlement, and the like. The data relating to litigation can be stored in one or more database tables such as litigation data table 370.

The claims processing module 325 processes the claims using one or more methods. For example, the module 325 can process claims using an aggregate analysis, using a disaggregate analysis, trading matching for securities with zero basis, and/or the like. Data relating to claims can be stored in one or more database tables such as the claims table 375.

The risk mitigation module 330 can mitigate risks by identifying and/or analyzing potential issues that can cause risk in order to take actions that can mitigate such risks. For example, if a historical analysis of actions in a foreign jurisdiction is associated with certain risks, such risks can be proactively identified and an action can be evaluated for merit before the action is filed in the jurisdiction. In some embodiments, the risk mitigation module can offer adverse party cost (loser pays) insurance to clients (and in some instances plaintiff investors that are not clients) involved in litigations outside the United States that meet certain qualification criteria (e.g., meets disclosed underwriting guidelines, a regulator or another authority has found significant wrong doing). The availability of insurance reduces or eliminates risk-based disincentives to the clients seeking to recover portfolio losses due to actionable securities fraud to allow funds (e.g., pension funds) to evaluate each case on its merits. The data relating to risk, insurance premiums, enrollment in insurance and/or the like can be stored in one or more database tables such as the risk table 390.

The recovery and reconciliation module 335 can identify and review class action recoveries (by settlement or trial), provide an alert or notice of settlement recoveries, identify sources of recovery available to satisfy judgment or settlement, factors that are likely to cause increase in recovery to be recognized from an action, and the like.

The user interface module 340 provides graphical user interfaces (e.g., client dashboard) via which clients of the system 300 can interact with the system 300, and utilize its features and functionalities. For example, using the user interface provided by the module 340, a client can configure a watch list based on desired specifications (e.g., for securities with certain volatility, certain market capitalization, etc.), and/or view download, print or email the watch list. The user interface module 340 can also include reporting, charting and/or analysis tools for creating and viewing reports, charts or visualizing analytics data. The notification engine 345 can detect when new updates or reports are available and can send those updates or reports as alerts (e.g., on the client dashboard, via email, via text message). The notification engine 345 can include settings that can be configured by the client to customize the type of events that should be sent as alerts, whether notifications should be sent as they come in or in batches, a frequency of the notifications, the contents of the notifications (e.g., a summary, full report, full report with CSV data). Various reports generated by the CIOR system 300 can be stored in the reports database table 395 in association with the client and/or investor identifier.

The custodian account table 355 can store custodian information (e.g., custodian of pension funds), investor account table 360 can store investor information (i.e., identification and other details relating to investors' on whose behalf all proof of claims are filed). The CIOR system 300 can store domestic and foreign securities policies for securities litigation in the US and in foreign jurisdiction in domestic securities policy table 385, and foreign securities policy table 380 respectively.

Figure 4:
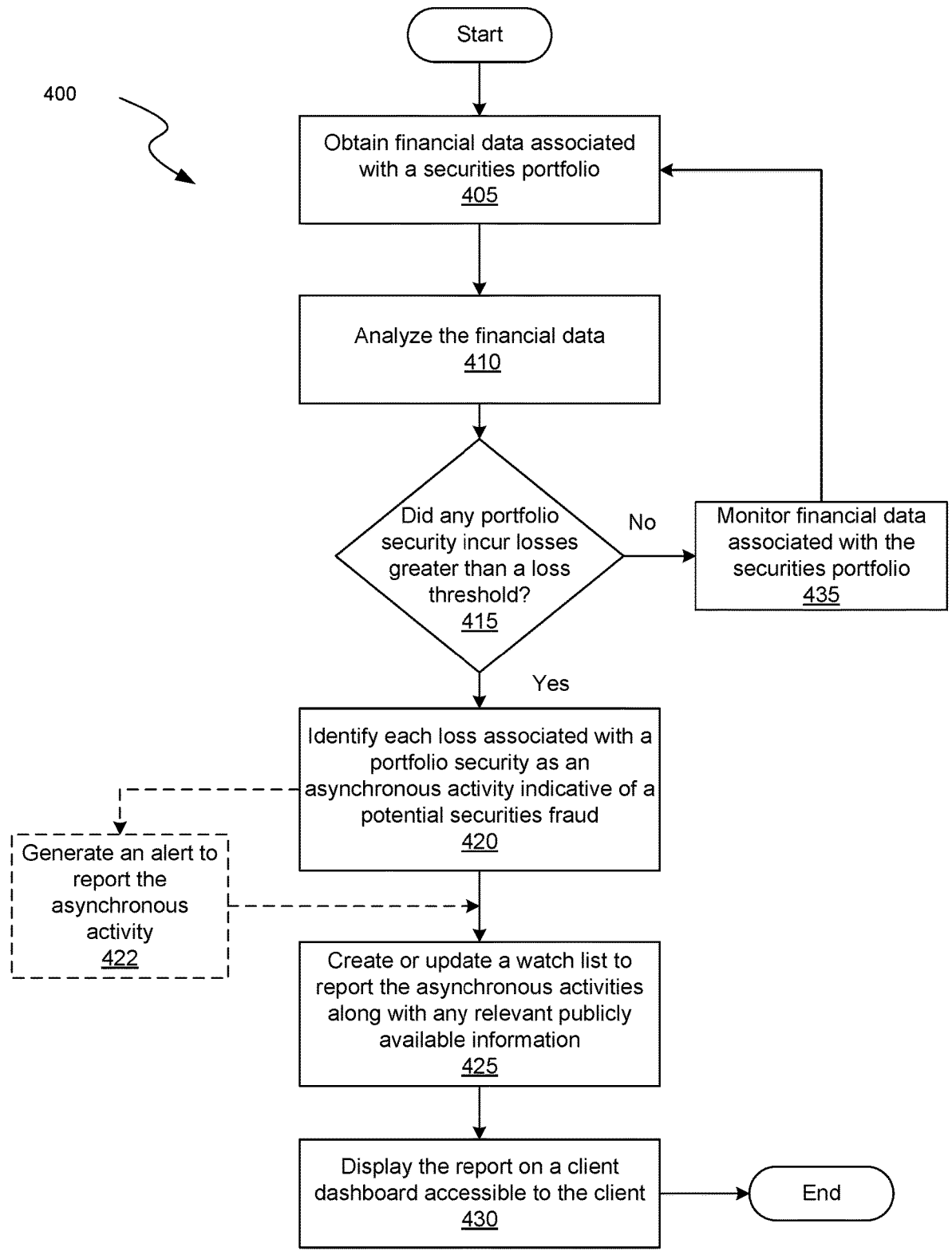
FIG. 4 illustrates a logic flow diagram of an example method of monitoring a securities portfolio to identify and report any asynchronous activity in the securities portfolio.

FIG. 4 depicts a logic flow diagram of an example method 400 of monitoring a securities portfolio to identify and report any asynchronous activity in the securities portfolio. As illustrated, the CIOR system (e.g., CIOR system 300 of FIG. 3) obtains financial data associated with the securities portfolio of an investor at block 405. The financial data can be provided as a data feed by a custodian of the securities portfolio. The financial data can include, for example, securities (e.g., shares) purchased or sold, price and/or other trading data. At block 410, the CIOR system analyzes the financial data to detect any asynchronous activity (e.g., suspicious losses) in the securities portfolio. At decision block, 415, the CIOR system determines if any portfolio security incurred losses greater than a loss threshold. The loss threshold can be a percent of the total value of the securities portfolio in some embodiments. In some embodiments, the CIOR system can determine, based on the analysis, whether a change in the value of a position on a security compared to a change in a value of a relevant industry index is more than a loss threshold. In some embodiments, the loss threshold can be specified by the client. The loss threshold can be specific to whether the portfolio security is a domestic exchange traded security or a foreign exchange security, the volatility basket to which the portfolio security is assigned to, or the like. If no portfolio security incurred any losses greater than the loss threshold or any loss in the value of a position on a security relative to a relevant industry index did not exceed a loss threshold, then the CIOR system can continue monitoring the financial data of the securities portfolio at block 435. However, if any of the portfolio security incurred any losses greater than the loss threshold or any loss in the value of a position on a security relative to a relevant industry index exceeded a loss threshold, the CIOR system can identify each loss associated with a portfolio security as an asynchronous activity that is indicative of a potential securities fraud at block 420. In some embodiments, the CIOR system can generate an alert to report the asynchronous activity to the client at block 422. The CIOR system can create or update a watch list (e.g., Tables 2 and 3) to report all the asynchronous activities detected by the system along with any other relevant publicly available information at block 425. At block 430, the report can be displayed on a client dashboard accessible by the client via a client device.

Figure 5:
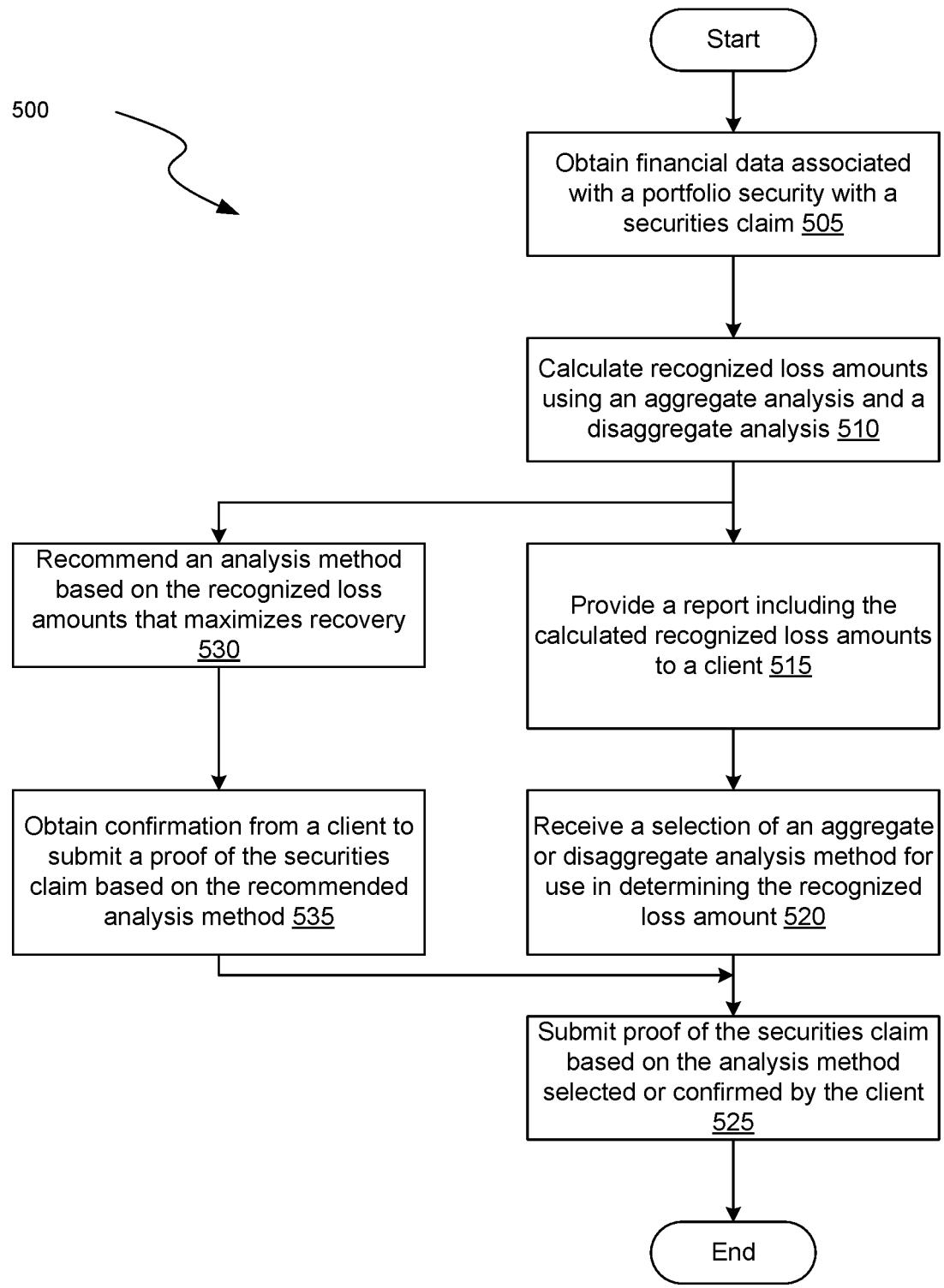
FIG. 5 illustrates a logic flow diagram of an example method of optimizing or maximizing recovery of revenue associated with a securities fraud.

FIG. 5 depicts a logic flow diagram of an example method 500 of optimizing or maximizing recovery of revenue associated with a securities fraud. As illustrated, the CIOR system (e.g., CIOR system 500) obtains financial data associated with a portfolio security associated with a securities claim for a securities fraud at block 505. The financial data can be provided as a data feed by a custodian of the securities portfolio. The financial data can include, for example, securities (e.g., shares) purchased or sold, price and/or other trading data. At block 510, the CIOR system can calculate recognized loss amounts using an aggregate analysis and a disaggregate analysis, each analysis involving a different portfolio allocation method. At block 515, the CIOR system can provide a report including the calculated recognized loss amounts to a client. The report (e.g., Table 1) can also include information identifying the securities litigation, status of the litigation, status of the claims processing, delta or difference between the recognized loss amounts and/or the like. In response to a request from the CIOR system to select an analysis method for calculating the recognized loss amounts, the client can select an analysis method and the CIOR system can receive the client selection at block 520. At block 525, the CIOR system can submit a proof of the securities claim based on the client-selected analysis method. In some embodiments, the CIOR system can recommend or automatically select an analysis method based on the recognized loss amounts to maximize recovery of revenue at block 530. At block 535, the CIOR system can then obtain confirmation from the client to submit a proof of the securities claim based on the recommended or selected analysis method. Upon obtaining confirmation from the client, the CIOR system can submit the proof of the securities claim based on the analysis method confirmed by the client.

The CIOR system, in various embodiments, provides a web-based and/or an application based interface for users (e.g., clients or customers). When clients log in to the CIOR system, the clients can see a dashboard that includes information related to securities litigation assets that the clients are managing. For example, the dashboard can display potential securities claims (e.g., from a watch list), active securities fraud class action cases, claims recovery pipeline, including information on the status of claims filings for settled class actions and calculations of recognized loss, recovery reports and/or the like. In some embodiments, notifications of potential claims (e.g., claims corresponding to asynchronous activities) can be generated and sent to clients via email and can also be displayed on the client dashboard. A notification of a potential claim can include information identifying whether the potential claim is related to a domestic or foreign exchange traded security, security identifier (e.g., CUSIP), relevant dates, amount of securities held, loss amounts and/or other relevant information. Examples of notifications of potential claim are provided below.

Example 1

Foreign—Jill Smith Group
  Date(s):
  Pension Fund X held 4,745,426 shares
  Loss (one-day) $1,784,491.04 USD
    JSG LN Equity (London) had a negative 12.07% spread vs. its GICS-defined sub-industry cohort (Hotels, Resorts & Cruise Lines).
    No securities class action lawsuits have been filed against this company in the past year.
    The company has not issued any stock in the last 36 months, but issued rights in June 2012.

Example 2

Domestic
  Date(s): May 5, 2013
  ABC Foods, Inc.—Class A
  ABC US Equity (New York Exchange) had a negative 9.87% spread vs. its GICS-defined sub-industry cohort (Packaged Foods & Meats).
  Pension Fund X held 219,027 shares and had a one-day loss of $922,006.20 USD.
    An outbreak of bird flu in China caused a drop in ABC's international chicken sales.
    No securities class action lawsuits have been filed against this company in the past year.
    The company has not issued stock or rights in the past 36 months.

Example 3

Foreign
XYZ (Holdings) Limited
  Date(s): May 5, 2013
  XYZ Equity (Hong Kong Exchange) had a negative 7.48% spread vs. its GICS-defined sub-industry cohort (Real Estate Development).
  Pension Fund X held 425,800 shares and had a one-day loss of $559,212.35 USD.
    The company paid a dividend on May $5^{th}$.
    No securities class action lawsuits have been filed against this company in the past year.
    The company has not issued stock in the past 36 months, but has an assured entitlement (rights offering) to shares in a future offering pending.

Example 4

Foreign
Derby Limited
  Date(s): May 5, 2013
  DBY Equity (Hong Kong Exchange) had a negative 8.11% spread vs. its GICS-defined sub-industry cohort (Industrial Conglomerates).
  PRIM held 1,549,512 shares and had a one-day loss of $1,756,472.71 USD.
    The company paid a dividend on May 5th.
    No securities class action lawsuits have been filed against this company in the past year.
    The company has not issued stock or rights in the past 36 months, but issued an entitlement (rights offering) of 1 per 10 in 2011.

In some embodiments, notifications of potential claims that occur within a time period (e.g., on the same day) can be batched together and sent to the client (e.g., via email). In other embodiments, notifications can be sent as the potential claims are identified. All the notifications of potential claims can be displayed on the dashboard. Any new or unseen notifications can be identified using a flag or another indicator.

In some embodiments, the CIOR system subscribes to one or more litigation monitoring services to receive information about securities class actions filed in the United States and based on the information, the CIOR system can determine if any of the portfolio securities of a client involved in the securities class action caused the client a loss over a loss threshold. Examples of analyses of losses for portfolio securities associated with securities class actions are provided below. These analyses can be included in a report accessible to the client via the dashboard and/or other communication channels (e.g., email, fax) in some embodiments.

Example 1: PQ Global Markets, Inc.: High Frequency Trading Litigation

Not a stock loss case

Example 2: ABC City Southern (ASU)

On the following dates, Pension Fund X held the number of shares listed and had corresponding losses.

| Date | Shares | Loss ($) |
| --- | --- | --- |
| Jan. 24, 2013 | 58,800 | 1,046,052.00 |
| Feb. 18, 2013 | 52,900 | 226,941.00 |
| Total | | 1,272,993.00 |

ABC City Southern issued stock in April 2010.

Example 3: Life AF, Ltd. (LAF)

On the following dates, Pension Fund X held the number of shares listed and had corresponding losses.

| Date | Shares | Loss ($) |
| --- | --- | --- |
| Dec. 19, 2012 | 87,762 | 452,851.92 |
| Dec. 20, 2012 | 87,762 | 319,453.68 |
| Dec. 21, 2012 | 79,562 | 511,583.66 |
| Jan. 15, 2014 | 34,862 | 49,155.42 |
| Jan. 16, 2014 | 34,862 | 270,180.50 |
| Jan. 23, 2014 | 34,862 | 265,299.82 |
| Apr. 11, 2014 | 30,862 | 258,006.32 |
| Total | | 2,126,531.32 |

Life AF has not issued any stock or rights within the past 36 months.
The company did buyback its own stock in May 2010, July 2012, and February 2013.
Life AF issued $1.15 billion of debt in February 2013.

For foreign securities litigation, the CIOR system can subscribe to one or more foreign litigation monitoring services and perform loss analyses similar to the loss analyses described above for US securities. The CIOR system can then generate a report for the client. An example report can include information identifying the issuer, litigation funding entity, counsel for securities litigation, deadlines for joining the securities litigation, potential claims, a summary of holdings or positions, losses and damages and/or the like. An example report generated by the CIOR system is provided below. The report can be at least partially or fully generated by the CIOR system using a report template by inserting data received from the litigation monitoring service (raw or processed data), input from an advisor associated with the CIOR system, financial data from the custodian data feed, loss and damages calculated by the CIOR system and/or the like.

Example Report

We received notice from XYZ Monitoring Service that Pension Fund X is likely eligible to participate in a proposed class action against ABX Insurance Group Limited in Australia. J. Smith is investigating this class action with the financial support of USAU Litigation Funding Partners Pvt. Ltd ("USAU").

While Pension Fund X suffered substantial losses (over $6 million) in this security, most of its purchases were before the proposed class period and thus Pension Fund X has only a relatively modest interest in the case as proposed. The process for registering for this class action is different than typical class actions. J. Smith requests that investors register online. Institutional investors are not required to provide details of holdings or share transactions and are not required to enter in the agreements as part of the online registration process.

Given the size of Pension Fund X's losses, we propose to press J. Smith to see if the class period can be expanded or whether they may be alternative claims that could be brought on Pension Fund's behalf.

ISIN: AU000000ABX9

Deadline to join: Jun. 13, 2013 (based on our most recent request for an extension from J. Smith).

Class Period: Aug. 20, 2012-Dec. 6, 2012.

Holdings/Positions:
  We do not have information about Pension Fund's historical initial position in ABX.
  At the beginning of the class period (Aug. 20, 2012), Pension Fund X held 1,520,548 shares (@ $14.63 USD per share). The total value of these holdings was $22,245,617.24 USD.
  At the end of the class period (~Dec. 5, 2012), Pension Fund X held 1,525,495 shares (@ $14.01 USD). The total value of these holdings was $21,372,184.95 USD. Pension Fund X was a net buyer during the class period.
  After the corrective disclosure on December 9, the value of Pension Fund X's 1,525,495 shares dropped to $9.91 USD on Dec. 10, 2012. The total value of these holdings was $15,117,655.45 USD.
  Pension Fund X currently holds 1,403,799 shares (@10.41 USD per share). The total value of Pension Fund X's current holdings is $14,613,547.59 USD.

Percentage stock drop:
  29.3% stock drop in ABX from end of class period to just after corrective disclosure on December 10.
  32.3% stock drop from beginning of class period to December 10.

Losses and Damages:
  According to XYZ, Pension Fund X suffered losses of approximately $22,712.46 USD ($24,422 AUD) in losses arising out of its acquisition of 4,947 ABX ordinary shares on Aug. 27, 2012 (during the class period). This figure represents Pension Fund's maximum recoverable damages. (Recoverable damages are losses on shares acquired during the class period).
  Between December 5 and Dec. 10, 2012, the value of Pension Fund X's ABX holdings dropped by ~$6.25 million USD following a Dec. 9, 2012 corrective disclosure by ABX. However, these unrecognized losses relate to all of Pension Fund X's holdings, including those acquired BEFORE the class period. (The value of Pension Fund X's holdings dropped ~$7.13 million USD from the beginning of the class period to December 10).
  Based on the value of Pension Fund X's holdings from the beginning of the class period (Aug. 20, 2012) to present (May 20, 2013), Pension Fund X has suffered a Net Loss of $7,632,069.65 USD. Please note that this figure does NOT take into account losses or gains due to Pension Fund X's buying or selling shares of ABX. This figure only represents net loss of the value of Pension Fund X's holdings in ABX from Aug. 20, 2012-May 20, 2013.

As described above, the CIOR system can, in some embodiments, perform active case monitoring and claim valuation. For domestic cases, the CIOR system can calculate maximum recoverable damages using a suitable methodology (e.g., the NAPPA damages model, which calculates maximum damages recovery) using transactional data from the custodian or another party (e.g., claims filing agent). One example method of calculating maximum recoverable damages using the NAPPA damages model is provided below:

1. If there are holdings at the start of the class period, the holdings are valued at the closing price the day before the first day of the class period (i.e., the date the fraud is presumed to first affect the market's valuation of the security).
2. As sales occur during the class period, the sales are matched against the initial holdings until all the initial holdings have been "depleted". Gain or loss on these sales is determined by comparing the sales price to the valuation set in step one.
3. If there are subsequent sales during the class period, the subsequent sales are matched against buys during the class period on a FIFO basis, calculating gain or loss.
4. If there are holdings at the end of the class period, they are valued at the PSLRA (Private Securities Litigation Reform Act) "cap" price, and matched against buys on a FIFO basis, to determine unrecognized losses. (If there were initial holdings, but neither buys nor sales, there are no losses.)
5. The amounts calculated in steps 2-4 are summed to establish a proxy for the maximum amount the fund (e.g., pension fund) might expect to recover at the end of the case.

Another method of calculating maximum recoverable damages using the NAPPA damages model is provided below:

1. If there are holdings at the start of the class period, and there are sales during the class period, the holdings are "depleted" by the sales until they are all matched. No gain or loss is calculated.

In some embodiments, FIFO and LIFO losses can be calculated as follows:
  A. All trade data is loaded and normalized in a database.
  B. The system automatically identifies eligibility against all ongoing class action lawsuit, based on trading history.

C. Based on the results of step B, the system automatically runs the "Buy-Sell-Match" program for each lawsuit in which eligibility has been determined. This program matches purchases and sales of securities and is a necessary step before losses can be calculated. This program can be run twice, once each for both FIFO and LIFO.

D. Trading Loss calculations will be performed against the "Buy-Sell-Match" records created in step C. In general, applicable losses are limited to Buy-Sell-Match records for which the purchase occurs during the class period. For each Buy-Sell-Match record, the loss is equal to the difference between the purchase and sale prices multiplied by the quantity of shares. In the event that the shares were held past the end of the 90-day PSLRA look-back period, however, a holding price will be substituted for the actual sale price.

E. The system generates a report comparing FIFO/LIFO losses for each case-account combination for which eligibility was determined.

The CIOR system can also calculate maximum recoverable damages on an aggregated and disaggregated basis. The calculated damages can be displayed on the client dashboard. The client dashboard can also track and display notice of case developments, case decision deadlines such as statute of limitations deadlines, class representative selection/group action joinder deadlines, opt out deadlines, statute of repose deadlines, settlement objection deadlines and/or the like allowing clients to access all relevant information from a centralized location.

In some embodiments, the CIOR system can generate asset recovery reports that can be accessed via the client dashboard and can be additionally delivered as an alert to clients. Examples of asset recovery reports can include a notice of settlement/right to recover. The CIOR system can calculate an increased recognized loss over baseline and generate a pipeline report. The pipeline report can include information such as a case name, settlement fund, claim deadline, opt out date, estimated pay date, market loss (e.g., FIFO), disaggregate RL, aggregate RL, pro-rata settlement shares, filing method, filed date, claim status and/or the like. The CIOR system can also generate notice of claims submissions, notice of recovery (e.g., including calculation of increased recovery over baseline) and/or other periodic reports.

Figure 6:
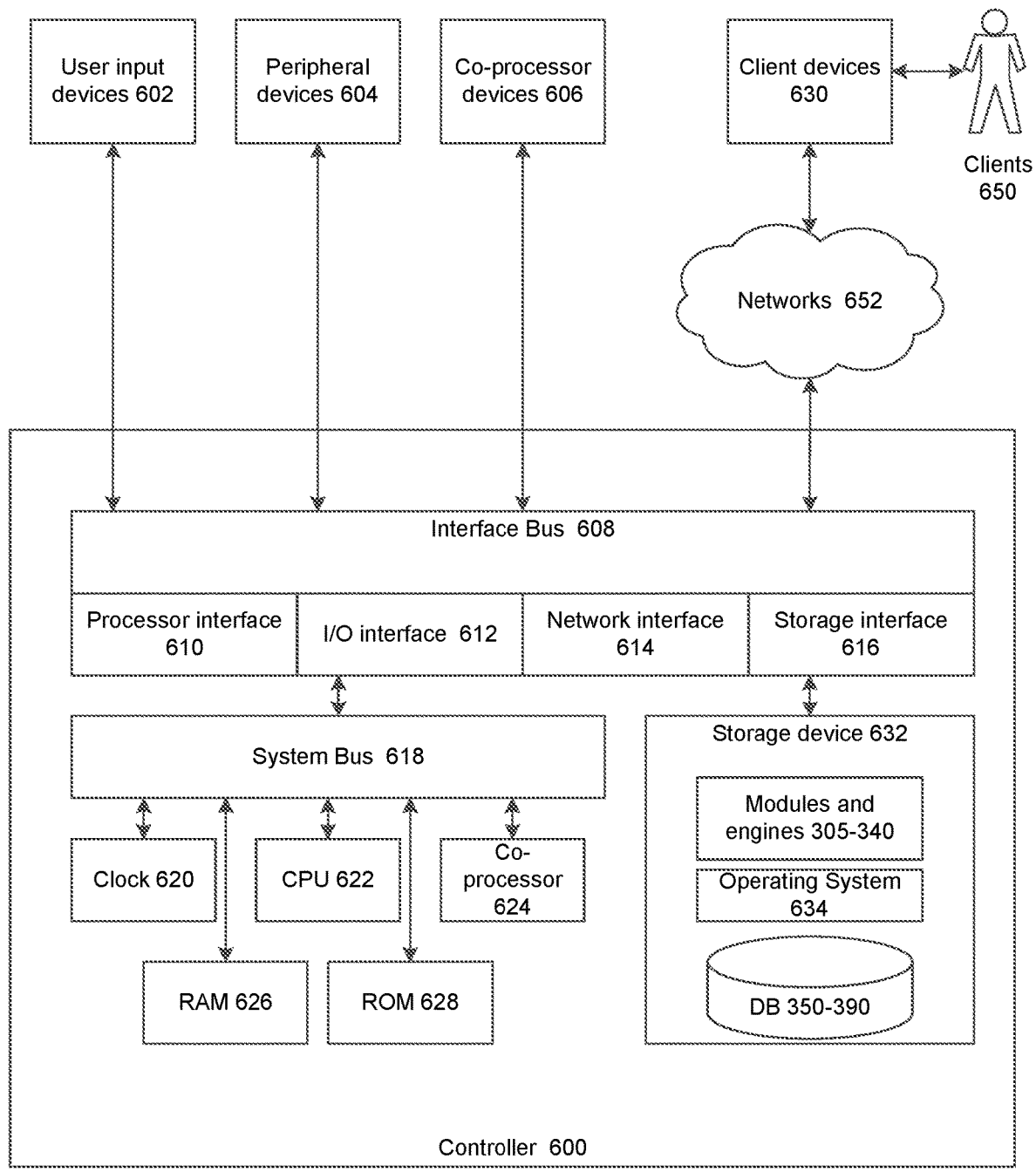
FIG. 6 depicts a block diagram of an example machine implementing the system for securities claims identification, optimization and recovery.

FIG. 6 depicts a block diagram of an example machine or controller 600 in the form of a computer system within which a set of instructions for causing the machine to perform one or more of the methodologies described herein can be executed.

The machine 600 is intended to illustrate a hardware device on which any of the components depicted in the example FIGS. 1, 2 and 3 (and any other component described in this application such as client computer system 120A-N, the CIOR system 110, the CIOR system 300) can be implemented. The machine 600 can be in communication with entities including one or more users (e.g., clients 650), client/terminal devices 630, user input devices 602, peripheral devices 604, an optional co-processor device(s) (e.g., cryptographic processor devices) 606, and networks 110. Users can engage with controller 600 via client devices 630 over networks 652.

Computers employ central processing unit (CPU) or processor (hereinafter "processor") to process information. Processors can include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components can be implemented in software, hardware or both hardware and software. Processors pass instructions (e.g., operational and data instructions) to enable various operations.

The controller 600 can include clock 620, CPU 622, memory such as read only memory (ROM) 628 and random access memory (RAM) 626 and co-processor 624 among others. These controller components can be connected to a system bus 618, and through the system bus 618 to an interface bus 608. Further, user input devices 602, peripheral devices 604, co-processor devices 606, and the like, can be connected through the interface bus 608 to the system bus 618. The Interface bus 608 can be connected to a number of interface adapters such as processor interface 610, input output interfaces (I/O) 612, network interfaces 614, storage interfaces 616, and the like.

Processor interface 610 can facilitate communication between co-processor devices 606 and co-processor 624. In one implementation, processor interface 610 can expedite encryption and decryption of requests or data. Input Output interfaces (I/O) 612 facilitate communication between user input devices 602, peripheral devices 604, co-processor devices 606, and/or the like and components of the controller 600 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 614 can be in communication with the network. Through the network, the controller 600 can be accessible to remote client devices 630. Network interfaces 614 can use various wired and wireless connection protocols such as, direct connect, Ethernet, wireless connection such as IEEE 802.11a-x, and the like. Examples of network 652 include the Internet, Local Area Network (LAN), Metropolitan Area Network (MAN), a Wide Area Network (WAN), wireless network (e.g., using Wireless Application Protocol WAP), a secured custom connection, and the like. The network interfaces 614 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 616 can be in communication with a number of storage devices such as, storage devices 632, removable disc devices, and the like. The storage interfaces 616 can use various connection protocols such as Serial Advanced Technology Attachment (SATA), IEEE 1394, Ethernet, Universal Serial Bus (USB), and the like.

User input devices 602 and peripheral devices 604 can be connected to I/O interface 612 and potentially other interfaces, buses and/or components. User input devices 602 can include card readers, finger print readers, joysticks, keyboards, microphones, mouse, remote controls, retina readers, touch screens, sensors, and/or the like. Peripheral devices 604 can include antenna, audio devices (e.g., microphone, speakers, etc.), cameras, external processors, communication devices, radio frequency identifiers (RFIDs), scanners, printers, storage devices, transceivers, and/or the like. Co-processor devices 606 can be connected to the controller 600 through interface bus 608, and can include microcontrollers, processors, interfaces or other devices.

Computer executable instructions and data can be stored in memory (e.g., registers, cache memory, random access memory, flash, etc.) which is accessible by processors. These stored instruction codes (e.g., programs) can engage the processor components, motherboard and/or other system components to perform desired operations. The controller 600 can employ various forms of memory including on-chip CPU memory (e.g., registers), RAM 626, ROM 628, and storage devices 632. Storage devices 632 can employ any number of tangible, non-transitory storage devices or systems such as fixed or removable magnetic disk drive, an optical drive, solid state memory devices and other processor-readable storage media. Computer-executable instructions stored in the memory can include the system 300 having one or more program modules such as routines, programs, objects, components, data structures, and so on that perform particular tasks or implement particular abstract data types. For example, the memory can contain operating system (OS) component 634, program modules and other components (e.g., 305-345 in FIG. 3), database tables 350-395 (in FIG. 3), and the like. These modules/components can be stored and accessed from the storage devices, including from external storage devices accessible through an interface bus.

The database components 350-395 are stored programs executed by the processor to process the stored data. The database components can be implemented in the form of a database that is relational, scalable and secure. Examples of such database include DB2. MySQL, Oracle, Sybase, and the like. Alternatively, the database can be implemented using various standard data-structures, such as an array, hash, list, struct, structured text file (e.g., XML), table, and/or the like. Such data-structures can be stored in memory and/or in structured files.

The controller 600 can be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines can be located in both local and remote memory storage devices. Distributed computing can be employed to load balance and/or aggregate resources for processing. Alternatively, aspects of the controller 600 can be distributed electronically over the Internet or over other networks (including wireless networks). Those skilled in the relevant art will recognize that portions of the CIOR system (e.g., CIOR system 110, 300) can reside on a server computer, while corresponding portions reside on a client computer. Data structures and transmission of data particular to aspects of the controller 600 are also encompassed within the scope of the embodiments disclosed herein.

The above Detailed Description of embodiments of the disclosure is not intended to be exhaustive or to limit the embodiments to the precise form disclosed above. While specific examples for the embodiments are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative combinations or subcombinations. Each of these processes or blocks can be implemented in a variety of different ways. Also, while processes or blocks are at times shown as being performed in series, these processes or blocks can instead be performed or implemented in parallel, or can be performed at different times.

In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

From the foregoing, it will be appreciated that specific embodiments of the disclosure have been described herein for purposes of illustration, but that various modifications can be made without deviating from the spirit and scope of the disclosure. Accordingly, the disclosure is not limited.

What is claimed is:

1. A method comprising:
   receiving, via at least one processor, transactional financial data associated with a securities portfolio;
   identifying, via the at least one processor and based at least in part on the transactional financial data, asynchronous activity in the securities portfolio by determining that a change in a value of a position on a security in the securities portfolio is more than a threshold; and
   sending, to an electronic device, a message that includes at least one indicator corresponding to a claim recovery that is based at least in part on the asynchronous activity.

2. The method of claim 1, wherein the threshold is based at least in part on a portfolio impact associated with the change in the value of the position on the security and a market in which the security is traded.

3. The method of claim 2 further comprising:
   receiving, from the electronic device, an indication that the asynchronous activity is an actionable securities claim and a selected aggregation basis for the claim recovery.

4. The method of claim 3 further comprising:
   calculating, via the at least one processor and based at least in part on the selected aggregation basis, one or more recognized losses from the actionable securities claim.

5. The method of claim 4 further comprising:
   receiving, via the at least one processor, funds obtained from the claim recovery;
   comparing, via the at least one processor, the funds to the one or more recognized losses to determine a pro rata basis; and
   generating, via the at least one processor, an alert that indicates the funds are less than an expected pro rata share of the one or more recognized losses.

6. The method of claim 5 further comprising:
identifying, via the at least one processor, one or more positions in one or more sub-accounts of the securities portfolio, the one or more positions having a zero basis; and
assigning, via the at least one processor, a different basis to the one or more positions.

7. The method of claim 6, wherein the zero basis in the one or more positions is based at least in part on a moved asset.

8. The method of claim 6, wherein the different basis is a corrected basis.

9. The method of claim 1, wherein the securities portfolio includes a plurality of positions on a plurality of securities traded in one of a domestic exchange or a foreign exchange.

10. The method of claim 1, wherein when the asynchronous activity is an actionable securities claim, and the method further comprises:
determining a value of the claim recovery using a valuation model and historical settlement data.

11. A system comprising:
at least one processor; and
a memory device that stores an application that adapts the at least one processor to:
receive transactional financial data associated with a securities portfolio;
identify, based at least in part on the transactional financial data, asynchronous activity in the securities portfolio by determining that a change in a value of a position on a security in the securities portfolio is more than a threshold; and
send, to an electronic device, a message that includes at least one indicator corresponding to a claim recovery that is based at least in part on the asynchronous activity.

12. The system of claim 11, wherein the threshold is based at least in part on a portfolio impact associated with the change in the value of the position on the security and a market in which the security is traded.

13. The system of claim 12, wherein the application further adapts the at least one processor to:
receive, from the electronic device, an indication that the asynchronous activity is an actionable securities claim and a selected aggregation basis for the claim recovery.

14. The system of claim 13, wherein the application further adapts the at least one processor to:
calculate, based at least in part on the selected aggregation basis, one or more recognized losses from the actionable securities claim.

15. The system of claim 14, wherein the application further adapts the at least one processor to:
receive funds obtained from the claim recovery;
compare the funds to the one or more recognized losses to determine a pro rata basis; and
automatically generate an alert that indicates the funds are less than an expected pro rata share of the one or more recognized losses.

16. The system of claim 15, wherein the application further adapts the at least one processor to:
identify one or more positions in one or more sub-accounts of the securities portfolio, the one or more positions having a zero basis; and
assign a different basis to the one or more positions.

17. The system of claim 16, wherein the zero basis in the one or more positions is based at least in part on a moved asset.

18. The system of claim 16, wherein the different basis is a corrected basis.

19. The system of claim 11, wherein the securities portfolio includes a plurality of positions on a plurality of securities traded in one of a domestic exchange or a foreign exchange.

20. The system of claim 11, wherein when the asynchronous activity is an actionable securities claim, and the application further adapts the at least one processor to:
determine a value of the claim recovery using a valuation model and historical settlement data.

* * * * *